United States Patent
Hand, III et al.

(10) Patent No.: US 10,214,111 B2
(45) Date of Patent: Feb. 26, 2019

(54) ELECTRIFIED VEHICLE POWER CONVERSION FOR LOW VOLTAGE BUS

(71) Applicant: FORD GLOBAL TECHNOLOGIES, LLC, Dearborn, MI (US)

(72) Inventors: Michael J. Hand, III, Ypsilanti, MI (US); Richard Dyche Anderson, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 275 days.

(21) Appl. No.: 15/237,994

(22) Filed: Aug. 16, 2016

(65) Prior Publication Data

US 2018/0050597 A1 Feb. 22, 2018

(51) Int. Cl.
*B60L 1/00* (2006.01)
*B60L 3/00* (2006.01)
(Continued)

(52) U.S. Cl.
CPC ....... *B60L 11/1811* (2013.01); *B60L 11/1862* (2013.01); *B60L 11/1866* (2013.01);
(Continued)

(58) Field of Classification Search
CPC .............. B60L 11/1811; B60L 11/1862; B60L 11/1866; H02J 7/0026; H02J 7/0019
See application file for complete search history.

(56) References Cited

U.S. PATENT DOCUMENTS 6,873,134 B2  3/2005  Canter et al.
7,196,493 B2  3/2007  McGee et al.
(Continued)

FOREIGN PATENT DOCUMENTS

CN  100345362 C  12/2005
JP  3334742  10/2002
(Continued)

OTHER PUBLICATIONS

M. Muneeb Ur Rehman, et al, Control of a Series-Input, Parallel-Output Cell Balancing System for Electric Vehicle Battery Packs, Electrical and Computer Engineering, Utah State University, Logan Utah USA, Electrical, Computer and Energy Engineering, University of Colorado, Boulder Colorado USA, 978-1-4673-6847-6/15 © 2015 IEEE.

*Primary Examiner* — Alfonso Perez Borroto
*Assistant Examiner* — Esayas G Yeshaw
(74) *Attorney, Agent, or Firm* — David B. Kelley; MacMillan, Sobanski & Todd, LLC

(57) ABSTRACT

An electrified vehicle high voltage battery pack has series-connected battery units or cells combining to provide the high voltage. To power a low voltage bus (e.g., for low voltage accessories or charging a low voltage battery) in a balanced manner, a plurality of DC/DC converters each has an input coupled to a respective battery unit and the converters have respective outputs coupled in parallel to the low voltage bus. A first loop controller receives an actual bus voltage. The first controller generates a target current in response to the bus voltage adapted to regulate the actual bus voltage to a target voltage less than the high voltage. A second controller distributes the target current into a plurality of allocated current commands for respective converters according to respective states of charge of the battery units connected to the converters.

20 Claims, 4 Drawing Sheets

(51) Int. Cl.
  *B60L 11/18* (2006.01)
  *H02J 7/00* (2006.01)
  *B60L 15/00* (2006.01)
  *H02M 3/335* (2006.01)
  *H02M 1/00* (2006.01)

(52) U.S. Cl.
  CPC ............ *B60L 15/007* (2013.01); *H02J 7/008* (2013.01); *H02J 7/0018* (2013.01); *H02J 7/0019* (2013.01); *H02J 7/0026* (2013.01); *B60L 2210/10* (2013.01); *B60L 2240/526* (2013.01); *B60L 2240/527* (2013.01); *B60L 2240/529* (2013.01); *B60L 2240/547* (2013.01); *B60L 2240/549* (2013.01); *H02M 3/335* (2013.01); *H02M 2001/0074* (2013.01); *Y02T 10/645* (2013.01); *Y02T 10/7005* (2013.01); *Y02T 10/7044* (2013.01); *Y02T 10/7055* (2013.01); *Y02T 10/7061* (2013.01); *Y02T 10/7216* (2013.01); *Y02T 10/92* (2013.01)

(56) References Cited

U.S. PATENT DOCUMENTS

| | | | |
|---|---|---|---|
| 7,633,783 B2 | 12/2009 | Manabe et al. | |
| 7,750,505 B2 * | 7/2010 | Ichikawa | B60W 20/13 307/82 |
| 8,115,446 B2 | 2/2012 | Piccard et al. | |
| 8,263,276 B1 * | 9/2012 | Gurunathan | H01M 8/04947 307/18 |
| 8,395,280 B2 | 3/2013 | Graovac et al. | |
| 8,542,509 B2 | 9/2013 | Sagneri et al. | |
| 8,772,967 B1 | 7/2014 | Ikriannikov et al. | |
| 8,872,498 B2 | 10/2014 | Goetzenberger et al. | |
| 8,912,736 B2 | 12/2014 | Kim et al. | |
| 2008/0042493 A1 | 2/2008 | Jacobs | |
| 2009/0316453 A1 * | 12/2009 | Manabe | H02M 3/1582 363/78 |
| 2010/0207587 A1 * | 8/2010 | Oyobe | B60W 20/13 320/152 |
| 2011/0054726 A1 * | 3/2011 | Noumura | B60K 6/485 701/22 |
| 2015/0214757 A1 | 7/2015 | Zane et al. | |
| 2017/0146611 A1 * | 5/2017 | Yonan | H01M 10/42 |
| 2017/0214252 A1 * | 7/2017 | Preindl | H02J 7/0014 |

FOREIGN PATENT DOCUMENTS

| | | |
|---|---|---|
| JP | 3969165 | 9/2007 |
| JP | 5207055 | 6/2013 |

* cited by examiner

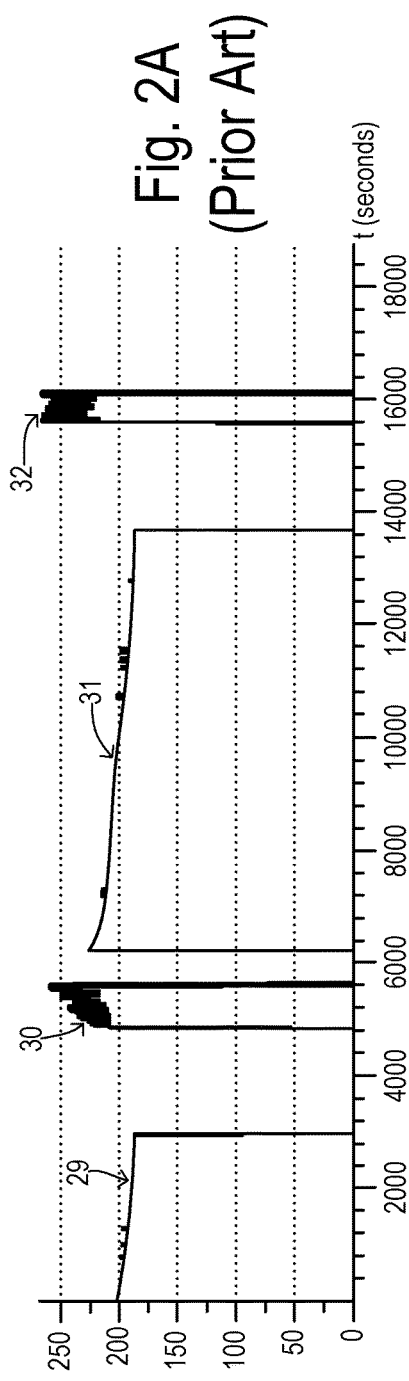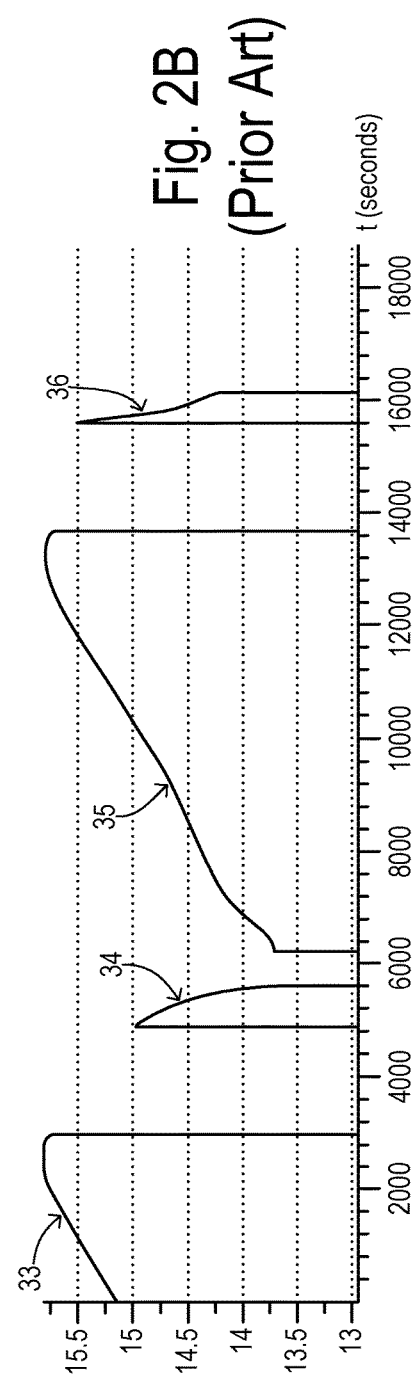

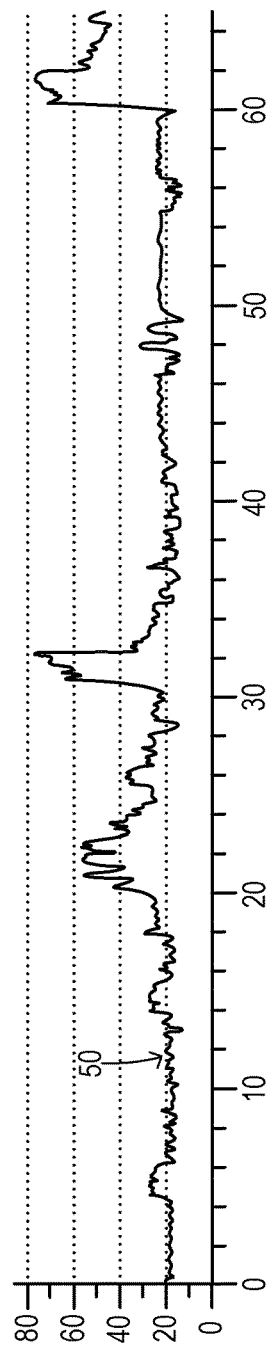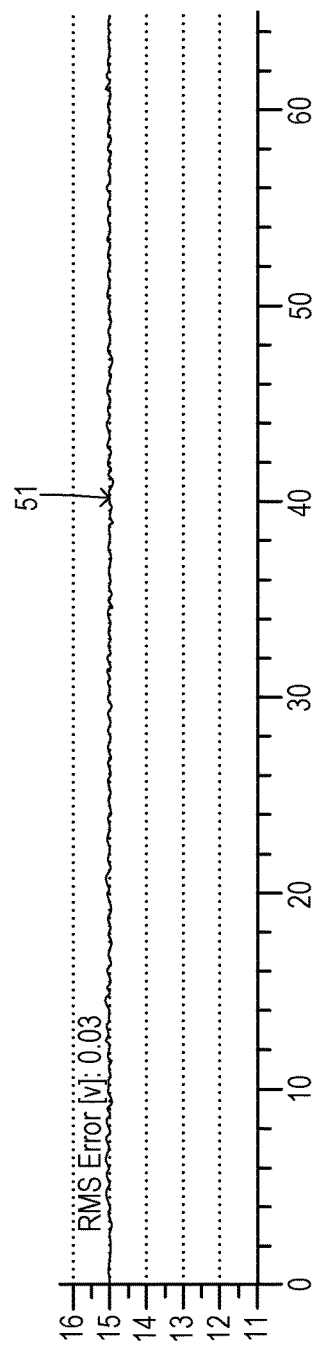

ELECTRIFIED VEHICLE POWER CONVERSION FOR LOW VOLTAGE BUS

STATEMENT REGARDING FEDERALLY SPONSORED RESEARCH

This invention was made with Government support under Contract No. DE-AR0000271 awarded by the Department of Energy. The Government has certain rights to the invention.

CROSS REFERENCE TO RELATED APPLICATIONS

Not Applicable.

BACKGROUND OF THE INVENTION

The present invention relates in general to electric power systems for electric vehicles, and, more specifically, to methods and apparatus for controlling DC/DC converters to convert a high voltage from a battery pack to a lower voltage for use on a low voltage bus in an electric vehicle.

Electrified vehicles such as battery electric vehicles and hybrid-electric vehicles typically utilize a high voltage power bus driven by a DC power source which may include storage and/or conversion devices such as a multi-cell battery pack. The battery pack may have a plurality of battery cells connected in series in order to provide the necessary power and/or voltage levels. The battery cells require real-time monitoring in order to maximize efficiency and performance, as well as to determine a battery state-of-charge (SOC) to predict a remaining driving range under battery power. Common battery types such as lithium ion (Li-Ion) use a large number of individual battery cells stacked together (connected in series and/or parallel), and groups of cells may be connected hierarchically in groups with monitoring of the groups rather than individual cells. As used herein, battery unit refers to an individual cell or a group of cells treated together.

In addition to the high voltage components associated with driving traction motors in the electrified vehicle, the vehicle also contains lower voltage electrical components and accessories (e.g., control modules, lighting, communications, and entertainment devices) as well as a lower voltage battery for supporting the low voltage components. In order to supply power from the main, high voltage battery pack to the low voltage components and/or to recharge the low voltage battery, a DC/DC converter has been used to down convert the high voltage to an appropriate lower voltage to drive a low voltage power bus.

Although it would be possible to tap into a small section of the battery pack to obtain the lower voltage, the resulting unbalanced drain of power from the battery pack would be undesirable. On the other hand, using a single DC/DC converter driven directly across the full high voltage of the battery pack requires high voltage components in the converter which results in a high cost. In order to obtain the necessary voltage conversion and to balance the electrical load among the plurality of battery cells, a bank of DC/DC converters has been used with the input of each converter connected to a different battery cell (or unit of cells) and with the converter outputs connected in parallel, as shown for example in U.S. Pat. No. 8,115,446 of Piccard et al, the disclosure of which is incorporated herein by reference.

A typical battery cell in the battery pack may generate about 4V. A target or setpoint voltage for the low voltage bus may be about 14V, for example. If each DC/DC converter covers one cell, then it is controlled to increase the voltage from 4V to 14V. If each converter covers six cells in series, then it is controlled to decrease the 24V across its input to the desired 14V.

U.S. patent application publication 2015/0214757A1 of Zane et al. discloses a plurality of DC/DC bypass converters with the outputs likewise connected in parallel, wherein operation of each converter is individually adjusted according to a battery state for its respective battery unit, to thereby decrease a rate of divergence of the battery state from a reference state. Thus, the states of charge for the battery units are more uniform, which improves overall performance of the battery pack. However, a side effect of independently varying the power from each DC/DC converter is that the common output voltage derived from the parallel connection of the converters may not remain constant at the desired value or range of values.

SUMMARY OF THE INVENTION

In one aspect of the invention, an electrified vehicle apparatus comprises a battery pack having series-connected battery units providing a main voltage. A plurality of DC/DC converters each has an input coupled to a respective battery unit, and the DC/DC converters have respective outputs coupled in parallel to a low-voltage bus. A first controller receives signals indicating an actual bus current. The first controller generates a target current in response to the actual bus current adapted to regulate the actual bus voltage to a target voltage. A second controller distributes the target current into a plurality of allocated current commands for respective DC/DC converters according to respective states of charge of the battery units connected to the DC/DC converters.

BRIEF DESCRIPTION OF THE DRAWINGS

FIGS. 2A and 2B are graphs showing DC/DC converter total input current and output voltage, respectively, over several drive cycles of a vehicle of the prior art.

FIGS. 5A and 5B are graphs showing a total target current and a common output voltage of the converters for one embodiment of the invention.

DETAILED DESCRIPTION OF PREFERRED EMBODIMENTS

The term "electrified vehicle" as used herein includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery or other DC source supplies energy for vehicle propulsion. A HEV includes an internal combustion engine and an electric motor, wherein the energy source for the engine is fuel and the energy source for the motor is a DC storage unit such as a battery. In a HEV, the engine is the main source of energy for vehicle propulsion with the battery providing supplemental energy for vehicle propulsion (e.g., the battery buffers fuel energy and recovers kinematic energy in electric form). A PHEV is like a HEV, but the PHEV may have a larger capacity battery that is rechargeable from the external electric grid. In a PHEV, the battery may be the main source of energy for vehicle propulsion until the battery depletes to a low energy level, at which time the PHEV operates like a HEV for vehicle propulsion.

A typical battery system may include a main battery pack and at least one battery energy controller module (BECM) for monitoring both individual cells and the battery pack as a whole. There may typically be one master BECM with satellite modules with additional sensing and processing. An output of the battery pack is connected via a high voltage bus to an inverter which converts the direct current (DC) power supplied by the battery pack to alternating current (AC) power for operating a traction motor in accordance with commands from a transmission control module (TCM), for example. The BECM, together with various sensors associated with the battery pack, monitors cell voltages, currents, temperatures, and state of charge, for example. The monitored parameters may be used to control various aspects of the electrical power system.

Figure 1:
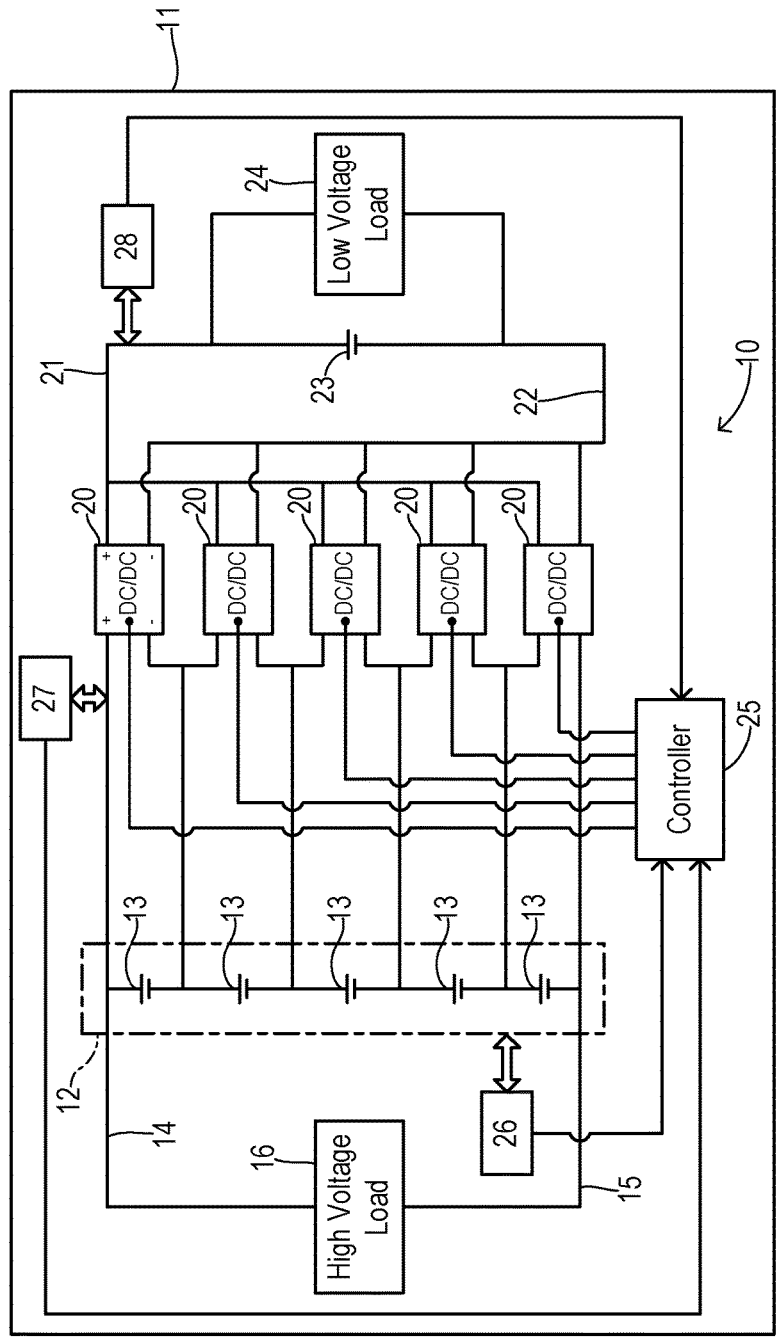
FIG. 1 is a block diagram of an embodiment of an electrical power system according to the invention.

Referring now to FIG. 1, an electrical power system 10 for an automotive vehicle 11 includes a battery pack 12 having a plurality of high-voltage battery units 13 connected in series to produce a main output voltage of hundreds of volts. Each battery unit 13 may include one or more cells (e.g., Lithium cells). The main output voltage is applied between a positive high-voltage bus 14 and a negative high-voltage bus 15 for use by high-voltage loads 16 (e.g., an inverter and traction motor). A plurality of DC/DC power converters 20 each has its respective input coupled across a respective one of battery units 13. The outputs of converters 20 are all connected in parallel between a positive low-voltage bus 21 and a negative low-voltage bus 22 for charging a low-voltage (e.g., lead acid) battery 23 and for use by low-voltage loads 24.

A typical configuration for DC/DC power converters 20 may include an input inverter bridge, a resonant circuit (e.g., transformer), and an output rectifier. As known in the art, MOSFETs or other switching devices in the inverter can be switched according to a variable duty cycle and/or frequency in order to regulate an output voltage or current that is output from the rectifier. Thus, a controller 25 is coupled to each converter 20 in order to command a desired operation of each converter. A plurality of sensor arrays 26, 27, and 28 are connected to controller 25 in order to provide parameter measurements necessary to allow controller 25 to properly regulate converters 20. Sensor array 26 may be comprised of at least one BECM for monitoring state of charge, voltage, and current for individual cells or battery units and for the battery pack as a whole. Sensor array 27 is an optional element that monitors input current flowing to each of the converters 20.

Sensor array 28 monitors bus voltage (and optionally the bus current) at low voltage bus 21/22. Using the actual bus current, controller 25 is able to provide improved regulation of converters 20 so that undesirable voltage fluctuations on the low-voltage bus are avoided. Such fluctuations are a disadvantage of the prior art as shown in FIGS. 2A and 2B which illustrate sample data during several drive cycles (i.e., road tests) of a vehicle, with combined output current of the converters being shown in FIG. 2A and a resulting bus voltage being shown in FIG. 2B. Since the prior art uses a predetermined current allocation for each DC/DC converter and adjusts the current allocation being delivered by each converter according to a difference between a state of charge of the respective battery unit and a target state of charge, the combined output current of the converters can vary haphazardly as shown by current trajectories 29-32 during successive drive cycles. As a result of the current variability, a voltage on the low-voltage bus also experiences significant variability around a desired target voltage of 15V as shown by trajectories 33-36.

The common output voltage from the parallel DC/DC power converters is a function of the average of the individual converter input voltages, the sum of the output currents, and the sum of the input currents. Since the output currents and the input voltages are not controllable, the only means of controlling the common output voltage is through regulating the sum of the input currents. Thus, the present invention employs a control strategy which allows a system of multiple DC/DC converters whose outputs are connected in parallel to be controlled to reach a target output voltage by directly considering the input currents. The added controller strategy works independently of the manner in which the total current is distributed among the converters. In other words, regulating the sum total of the currents may be comprised of a separate control loop from the strategy that balances the states of charge of the individual battery units. This total input current is then distributed among the converters according to a distinct distribution method (such as the method suggested in Zane et al publication US 2015/0214757A1).

Controller 25 is preferably comprised of a feedback controller in order to specify a total input current target based on a target voltage (i.e., setpoint voltage for the low-voltage bus) and the measured common output voltage from the DC/DC converters. Controller 25 can be static (i.e., relying only on the present values of the signals) or dynamic (i.e., relying on present and past values). Controller 25 can be purely feedback (relying only on the error between the setpoint voltage and the measured output voltage) or it can also make use of a feedforward term which is calculated from other measured or estimated values.

Figure 3:
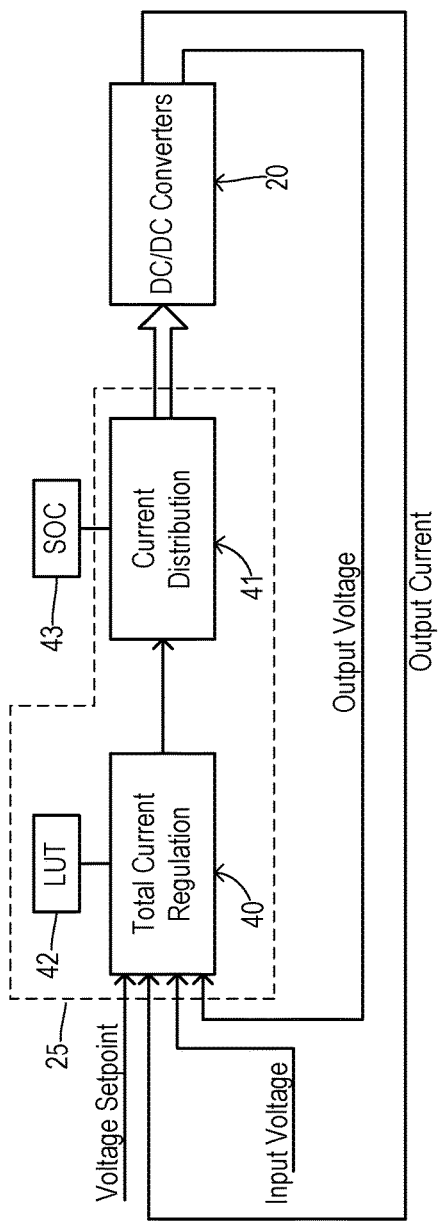
FIG. 3 is a block diagram showing a first embodiment of the invention for controlling the DC power converters.

FIG. 3 shows one preferred embodiment of controller 25 comprising a total current regulation block 40 and a current distribution block 41. Current regulation block 40 serves as an outer loop controller which receives a voltage setpoint (e.g., a target voltage of 15V for the low-voltage bus) and measured parameter values including an actual bus output voltage and actual bus output current. Current regulation block 40 also receives a measured value for the average input voltage to the converters (i.e., the average output voltage from the respective battery units used for powering the converters). The average battery unit voltage may be obtained from the BECM system, for example. Current regulation block 40 is preferably connected to a lookup table 42 which stores various control values according to the regulation strategy that is employed.

Current distribution block 41 serves as a control loop which receives the target total current from current regulation block 40 and distributes the target current into a plurality of allocated current commands for respective DC/DC converters 20 according to (e.g., in proportion to) respective states of charge (or the cell voltage) of the battery units connected to the DC/DC converters. The states of charge (SOC) are obtained from an SOC block 43 which may be comprised of the BECM system, for example. The target total current signal is a scalar value which is to be distributed. In order to avoid overload of wiring and other issues, the target total current is limited to some predetermined maximum value by regulation block 40. The distributed (i.e., allocated) current signal is a vector of current commands which is sent to the various power converters.

In one embodiment, controller 25 can be a proportional-integral-derivative (PID) controller, wherein any of the P, I, or D terms of the controller may be set to 0. In such an architecture, the regulated output is driven by the error between the setpoint (i.e., target) voltage and the measured voltage, although the derivative term could alternatively be driven solely by the measured voltage.

In another embodiment, current regulation block 40 in controller 25 makes use of a feedforward control law based on a steady-state characterization of the input-output power conversion equation for the overall converter. A common representation of the power balance is given by $V_{in} \cdot I_{in} \cdot \eta = V_{out} \cdot I_{out}$, where $\eta$ is the conversion efficiency. The conversion efficiency of a converter may depend on the input and output voltages or other parameters. Input voltage $V_{in}$ is an average of the individual voltages supplied from each respective battery unit to its respective DC/DC converter. Input current $I_{in}$ is the sum of all the individual input currents, and output current $I_{out}$ is the sum of all the individual output currents. A preferred expression for the feedforward law is:

$$I_{in} = \frac{v_{des} \cdot I_{out}}{v_{in} \cdot \eta}$$

where $I_{in}$ is the target current to be drawn by the DC/DC converters in combination, $v_{des}$ is the desired target voltage for the low-voltage bus, $I_{out}$ is the actual bus current, $v_{in}$ is an average of the voltages supplied by the battery units, and $\eta$ is the conversion efficiency. If one or more of the required values is not measurable, it may be replaced by an estimated value or a representative constant (any of which could be stored in LUT 42, for example). The feedforward term can also account for changes in other parameters. Conversion efficiency $\eta$ can be a constant value built into the regulator, obtained based on dynamic conditions from LUT 42, or calculated using an online, adaptive regression. In addition, conversion efficiency could be obtained by a mathematical function, wherein $\eta = f(V_{in}, T, I, \ldots)$.

In addition to purely feedback or feedforward control strategies, a combination of feedback and feedforward control variables may be used. For example, a feedback control variable from a PID controller can be added to a feedforward control variable obtained using the feedforward law described above.

In order to protect hardware components from changes in current or voltage which are not realizable or within safety bounds, controller 25 can use output saturation and/or slew rate limiting. Moreover, if controller 25 is a feedback controller using integral control, then anti-windup may be included to eliminate overshoots as a result of startup conditions or saturations. Controller gains (e.g., in a PID implementation) may vary depending on the size of the error or the magnitude of other parameters (such as setpoint voltage or a measured high-voltage across all the battery units).

Figure 4:
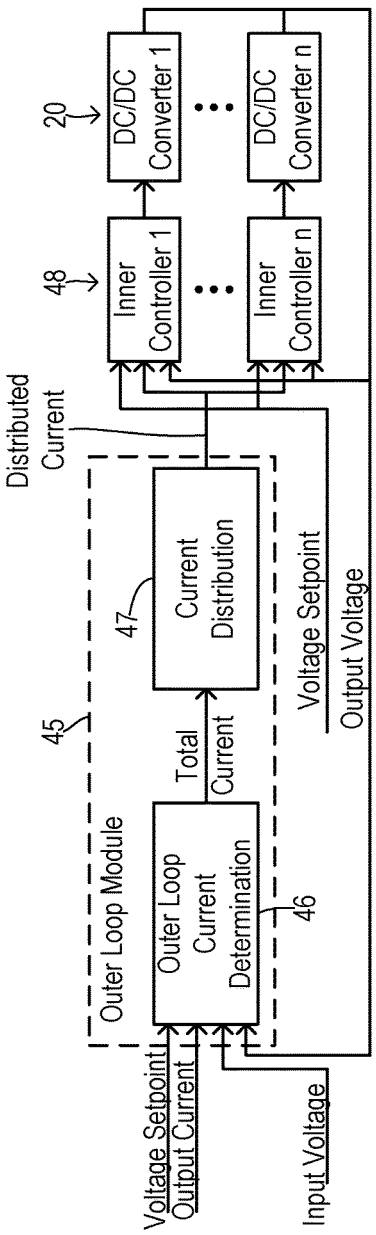
FIG. 4 is a block diagram showing an alternative embodiment of the invention.

FIG. 4 shows an alternative embodiment of the invention using a distributed control approach. A main "outer loop" module 45 includes an outer loop current determination block 46 (which may have a function which is identical to block 40 in FIG. 3) and a current distribution block 47. Outer loop block 46 determines the total target current required to maintain the output voltage, and then block 47 determines a current distribution among the respective DC/DC converters based on a remaining state of charge of each respective battery unit (e.g., assigning current values so that energy is drawn from the battery units in a manner that restores balance to, i.e., equalizes, the states of charge) in the same or a similar manner as block 41 in FIG. 3. Each of the resulting n allocated current command values are sent to a respective inner controller block 48, wherein each inner controller block 48 resides as a local control node in a respective circuit module with a respective one of converters 20. Inner controller blocks 48 utilize the current command values, along with feedback control on the output voltage, to determine a final current to be generated. A distributed controller system is disclosed in greater detail in copending U.S. application serial no. (83679839), filed concurrently herewith, entitled "Electrified Vehicle DC Power Conversion with Distributed Control," which is incorporated herein by reference in its entirety.

FIGS. 5A and 5B depict the improved voltage control obtained using the present invention. FIG. 5A shows a target total current curve 50 generated during a vehicle test cycle. In the simulated test, a cold 12V battery is present on the low-voltage bus because a cold battery is more difficult to control due to its higher internal resistance. Curve 50 shows that the total current necessary to regulate the output voltage varies according to conditions such as power draw on the low-voltage bus and other factors. The commanded total current produces the desired bus voltage along a curve 51 having a very low RMS error from the setpoint of 15V. Furthermore, cell balancing continues to be achieved based on distributing a higher proportion of the allocated current to a converter that is driven by a battery unit possessing a proportionally higher state of charge.

In operation, the outer loop controller and inner loop controller of the present invention may execute a method of converting a main voltage from series-connected battery units to either a higher or a lower voltage for a bus via parallel power converters each powered by a respective battery unit according to the following steps. A bus voltage is measured. An aggregate current is determined that regulates the bus voltage to a target. The aggregate current is allocated among the converters according to respective states of charge of the battery units.

In one embodiment, the determining step may be comprised of minimizing an error between the bus voltage and the target using a proportional-integral-derivative (PID) controller. The PID controller may include integral control with anti-windup. Furthermore, the PID controller may include a plurality of controller gains, and the determining step may further comprise adjusting the controller gains according to a magnitude of the error (e.g., increasing the gains for larger errors).

In another embodiment, the determining step may be comprised of using a feedforward controller to determine the aggregate current according to a conversion efficiency of the power converters. The conversion efficiency may be determined adaptively, or can be determined using a lookup table. Using the conversion efficiency as a feedforward terms, the target current can be determined according to a formula:

$$I_{in} = \frac{v_{des} \cdot I_{out}}{v_{in} \cdot \eta}$$

where $I_{in}$ is the target current to be drawn by the DC/DC converters in combination, odes is the desired target voltage, $I_{out}$ is the actual bus current, $v_{in}$ is an average of the voltages supplied by the battery units, and η is the conversion efficiency.

What is claimed is:

1. Electric vehicle apparatus comprising:
a battery pack comprising series-connected battery units providing a main voltage;
a plurality of DC/DC converters, each having an input coupled to a respective battery unit;
a low-voltage bus, wherein the DC/DC converters have respective outputs coupled in parallel to the low-voltage bus;
a first controller receiving an actual bus voltage, wherein the first controller generates a target current in response to the actual bus voltage adapted to regulate the actual bus voltage to a target voltage; and
a second controller distributing the target current into a plurality of allocated current commands for respective DC/DC converters according to respective states of charge of the battery units connected to the DC/DC converters.

2. The apparatus of claim 1 wherein the first controller is comprised of a proportional-integral-derivative (PID) controller responding to an error between the actual bus voltage and the target voltage.

3. The apparatus of claim 2 wherein the PID controller includes integral control with anti-windup.

4. The apparatus of claim 2 wherein the PID controller includes a plurality of controller gains, wherein the controller gains are adjusted according to a magnitude of the error.

5. The apparatus of claim 1 wherein the first controller is comprised of a feedforward controller responsive to an actual bus current.

6. The apparatus of claim 5 wherein the feedforward controller determines the target current according to a conversion efficiency of the DC/DC converters.

7. The apparatus of claim 6 wherein the conversion efficiency is adaptively determined.

8. The apparatus of claim 6 wherein the conversion efficiency is determined using a lookup table.

9. The apparatus of claim 6 wherein the target current is determined according to a formula:

$$I_{in} = \frac{v_{des} \cdot I_{out}}{v_{in} \cdot \eta}$$

where $I_{in}$ is the target current to be drawn by the DC/DC converters in combination, odes is the desired target voltage, $I_{out}$ is the actual bus current, $v_{in}$ is an average of the voltages supplied by the battery units, and η is the conversion efficiency.

10. The apparatus of claim 1 wherein the first controller limits a rate of change of each respective allocated current command.

11. The apparatus of claim 1 wherein the second controller is distributed among a plurality of converter modules and a main module, wherein the main module further comprises the first controller.

12. A method of converting a main voltage from series-connected battery units to a target voltage for a bus via parallel power converters each powered by a respective battery unit, comprising the steps of:
measuring a bus voltage;
determining an aggregate current that regulates the bus voltage to the target;
allocating the aggregate current among the converters according to respective states of charge of the battery units.

13. The method of claim 12 wherein the determining step is comprised of:
minimizing an error between the bus voltage and the target using a proportional-integral-derivative (PID) controller.

14. The method of claim 13 wherein the PID controller includes integral control with anti-windup.

15. The method of claim 13 wherein the PID controller includes a plurality of controller gains, and wherein the determining step further comprises adjusting the controller gains according to a magnitude of the error.

16. The method of claim 12 wherein the determining step is comprised of using a feedforward controller to determine the aggregate current according to a measured bus current and a conversion efficiency of the power converters.

17. The method of claim 16 wherein the conversion efficiency is adaptively determined.

18. The method of claim 16 wherein the conversion efficiency is determined using a lookup table.

19. The method of claim 16 wherein the aggregate current is determined according to a formula:

$$I_{in} = \frac{v_{des} \cdot I_{out}}{v_{in} \cdot \eta}$$

wherein $I_{in}$ the aggregate current to be drawn by the power converters in combination, $v_{des}$ is the target, $I_{out}$ is the bus current, $v_{in}$ is an average of the voltages supplied by the battery units, and η is the conversion efficiency.

20. The method of claim 12 wherein a rate of change of each respective allocated current is limited.

* * * * *